United States Patent
Lund-Olesen et al.

(10) Patent No.: US 12,218,388 B2
(45) Date of Patent: Feb. 4, 2025

(54) DIRECT ALCOHOL FUEL CELL

(71) Applicant: Widex A/S, Lynge (DK)

(72) Inventors: Torsten Lund-Olesen, Kastrup (DK); Boris Valnert, Frederikssund (DK); Michael Frydendal Larssen, Veksoe (DK); Kasper Vestentoft, Copenhagen (DK); Oskar Tynelius, Sandby (SE); Jacob Lindner Bonde, Skarup (DK); Jan Harry Hales, Farum (DK); Leif Hoejslet Christensen, Roskilde (DK)

(73) Assignee: Widex A/S, Lynge (DK)

( * ) Notice: Subject to any disclaimer, the term of this patent is extended or adjusted under 35 U.S.C. 154(b) by 919 days.

(21) Appl. No.: 17/298,706

(22) PCT Filed: Dec. 2, 2019

(86) PCT No.: PCT/EP2019/083281
§ 371 (c)(1),
(2) Date: Jun. 1, 2021

(87) PCT Pub. No.: WO2020/114955
PCT Pub. Date: Jun. 11, 2020

(65) Prior Publication Data
US 2022/0052355 A1 Feb. 17, 2022

Related U.S. Application Data

(60) Provisional application No. 62/776,166, filed on Dec. 6, 2018.

(51) Int. Cl.
*H01M 8/0247* (2016.01)
*H01M 8/0232* (2016.01)
(Continued)

(52) U.S. Cl.
CPC ....... *H01M 8/0247* (2013.01); *H01M 8/0232* (2013.01); *H01M 8/1011* (2013.01); *H01M 2008/1095* (2013.01); *H01M 2250/30* (2013.01)

(58) Field of Classification Search
None
See application file for complete search history.

(56) References Cited

U.S. PATENT DOCUMENTS

| 5,543,241 A | 8/1996 | Nishioka et al. |
| 7,947,408 B2 | 5/2011 | Ichioka |

(Continued)

FOREIGN PATENT DOCUMENTS

| EP | 2 388 850 A2 | 11/2011 |
| WO | 2014/005598 A1 | 1/2014 |

OTHER PUBLICATIONS

International Search Report of PCT/EP2019/083281 dated Feb. 17, 2020 [PCT/ISA/210].

(Continued)

*Primary Examiner* — Wyatt P McConnell
(74) *Attorney, Agent, or Firm* — Sughrue Mion, PLLC

(57) ABSTRACT

The present invention relates to a direct alcohol fuel cell (DAFC) comprising an anode terminal electrically connected to an anode catalyst in fluid communication with a fuel supply; a cathode catalyst in fluid communication with a gaseous oxidant; an electrically conducting cathode plate having a collecting element with evaporation holes, a bendable segment and a terminal site, which collecting element is electrically connected to the cathode catalyst; and a housing containing the collecting element, and a proton exchange membrane (PEM) between the anode catalyst and the cathode catalyst.

10 Claims, 2 Drawing Sheets

(51) Int. Cl.
    *H01M 8/1011*    (2016.01)
    *H01M 8/10*       (2016.01)

(56) References Cited

U.S. PATENT DOCUMENTS

2007/0287053 A1   12/2007   Ichioka
2009/0035638 A1*   2/2009   Tsai ..................... H01M 8/241
                                                                             429/510

OTHER PUBLICATIONS

Written Opinion of PCT/EP2019/083281 dated Feb. 17, 2020 [PCT/ISA/237].

* cited by examiner

DIRECT ALCOHOL FUEL CELL

CROSS REFERENCE TO RELATED APPLICATIONS

This application is a National Stage of International Application No. PCT/EP2019/083281 filed on Dec. 2, 2019, claiming priority based on U.S. Provisional Patent Application No. 62/776,166 filed on Dec. 6, 2018.

FIELD OF THE INVENTION

The present invention relates to a direct alcohol fuel cell (DAFC) and to a cathode terminal for a DAFC. The DAFC can be flexibly integrated with a microelectronic device.

PRIOR ART

In general batteries are becoming inadequate with respect to the power requirements for portable electronics. As the development of such devices strives towards smaller devices typically having the same or higher power requirements the limited energy density of conventional batteries becomes critical. Examples of such devices are microelectronic devices e.g. various microsensors, microengines, biomedical microsystems, microelectromechanical systems (MEMS) etc. Hearing aids are an extreme case of such portable devices with high demands on the power source. Currently, high-end hearing aids working at large amplifications have to have replaced the non-rechargeable zinc-air type batteries every 1 to 8 days—depending on the type of the battery and the hearing aid. For example, a hearing aid will typically require about 1 mW when no amplification is needed, and about 10 mW with moderate amplification with higher peaks of 15-20 mW or more when high amplification is required. In principle the Zn-air systems can be categorised as a non-rechargeable fuel cell, but are henceforth referred to as a battery to maintain the distinction towards proton conducting fuel cells.

The ideal power source for these types of devices would have larger power densities, re-chargeable capabilities and easy handling (when recharging), and DAFCs provide an alternative to Zn-air batteries. Pure methanol and ethanol have 27 and 32 times larger energy densities by weight, respectively, than Zn-Air batteries. When comparing energy density by volume the numbers are 6 and 7 times, thus, ideally providing at least a 6-fold increase in operating time (when neglecting the system volume of the fuel cell). Furthermore, the fuel cell will be capable of being recharged in a matter of minutes or even seconds by simply replenishing the fuel.

DAFCs are well-known in the prior art. In general terms, a DAFC typically comprises a fuel cell stack containing a cathode terminal, a cathode electrode and catalyst, which, via a proton exchange membrane (PEM), are separated from an anode electrode and catalyst, and an anode terminal. Fuel, i.e. alcohol, enters the anode section and $O_2$, e.g. contained in ambient air, enters the cathode section, and due to the selective diffusion of protons across the PEM oxidation of the alcohol takes place at the anode and reduction of $O_2$ takes place and the cathode so that an electrical potential is generated between the anode and the cathode to allow the fuel cell to power an electrical circuit.

U.S. Pat. No. 7,947,408 discloses a fuel cell for burning a fuel gas, such as hydrogen, and aims to provide lighter weight fuel cells. U.S. Pat. No. 7,947,408 focuses on providing thinner collecting plates (separators and terminal plates), since the high voltage obtained from stacked fuel cells, requires that the terminal plates are thick enough to collect such high voltage and have a large thermal capacity, but observe that thick collecting plates steal heat generated by adjacent end cells, and tend to adversely affect start-up characteristics at low temperature. U.S. Pat. No. 7,947,408 thus suggests to employ an output terminal that is electrically connected to the collecting section and has a thickness that is greater than the thickness of the collecting section, and further that the collecting section and the output terminal are formed from a single sheet member. The output terminal is formed by bending the output terminal forming portion so that opposing faces come into contact and a first surface of the output terminal forming portion that is positioned on a first side of a bend is flush with a second surface of the terminal forming portion that is positioned on a second side of the bend.

However, the technology of U.S. Pat. No. 7,947,408 relates to hydrogen fuel cells providing high voltages and being of a scale inappropriate for a fuel cell for a microelectronic device.

U.S. Pat. No. 5,543,241 discloses a cell structure for use in a fuel cell and the object is to provide a compact, high-voltage generating fuel cell, which is easy to assemble and whose cell matrix can be easily changed. The cell structure comprises a pair of insulating keep-plates sandwiching the anode, the cathode and the PEM. However, the fuel cell is a hydrogen fuel cell and the high voltage, e.g. 120 V, is not relevant for a fuel cell for a microelectronic device.

In contrast to the challenges faced by U.S. Pat. Nos. 5,543,241 and 7,947,408, DAFCs for microelectronic devices, especially hearing aids, are faced with specific challenges relating to the available space for the fuel cell. It is an aim of the present invention to address this need, and moreover the present invention aims to solve problems related to transportation of gasses at the cathode of a DAFC.

SUMMARY OF THE INVENTION

The present invention relates to a direct alcohol fuel cell (DAFC) comprising an anode terminal electrically connected to an anode catalyst in fluid communication with a fuel supply; a cathode catalyst in fluid communication with a gaseous oxidant; an electrically conducting cathode plate having a collecting element with evaporation holes, a bendable segment and a terminal site, which collecting element is electrically connected to the cathode catalyst; and a housing containing the collecting element, and a proton exchange membrane (PEM) between the anode catalyst and the cathode catalyst.

In the context of the invention, the PEM, the anode catalyst, the anode terminal, the cathode catalyst and the electrically conducting cathode plate may collectively be referred to as the "fuel cell components", and either of these components may be referred to as a "fuel cell component".

The DAFC can be considered to burn an alcohol, typically methanol, so that the DAFC employs, in addition to the alcohol fuel, a gaseous oxidant, e.g. $O_2$, especially $O_2$ contained in ambient air. Other oxidants, especially other gaseous oxidants, are also contemplated. The reaction between $O_2$ and the alcohol will create $CO_2$ and $H_2O$, e.g. gaseous $H_2O$, as waste components. The evaporation holes provide fluid communication with the ambient atmosphere or alternatively with a supply of a gaseous oxidant. The alcohol is gradually oxidised to eventually be converted to $H_2O$ and $CO_2$ as waste products. Consequently, in the context of DAFCs the intermediary oxidation states from the alcohol to the final waste products may also be employed as fuel, e.g. for a DMFC formaldehyde and formic acid may also be used as fuel.

The anode catalyst is in fluid communication with a fuel supply, and the cathode catalyst is in fluid communication with a gaseous oxidant. In the context of the invention, the term "fluid communication" is to be understood broadly, so that the fluid in fluid communication may be a gas or a liquid, and moreover liquids in fluid communication may be converted to gasses when in fluid communication. For example, a methanol fuel may evaporate from a reservoir so that gaseous methanol is supplied to the anode catalyst. The DAFC may contain any component as desired between the anode catalyst and the fuel supply and/or between the cathode catalyst and the source of the gaseous oxidant, e.g. ambient air, respectively, as long as the component does not block fluid communication. For example, the DAFC may contain filters, permeable membranes, diffusion layers, etc. which are commonly employed in DAFCs. Appropriate filters, permeable membranes, and diffusion layers are well-known to the skilled person.

In the DAFC of the invention a PEM is located between the anode catalyst and the cathode catalyst. Any material, e.g. the material known under the trademark "Nafion", that allows transportation of protons across the membrane may be used in the DAFC. The thickness of the PEM can be chosen freely, but the thickness will typically be in the range of 10 μm to 1 mm, e.g. from 20 to 500 μm 100 μm to 250 μm, or from 100 μm to 200 μm.

The diffusion of protons across the PEM allows that an electrical potential is created between the anode terminal and the electrically conducting cathode plate, e.g. as represented by the terminal site. The anode terminal is therefore electrically isolated from the electrically conducting cathode plate, including the terminal site. The electrical isolation may be obtained using any electrically insulating material, e.g. a polymer.

The DAFC has an electrically conducting cathode plate having a collecting element with evaporation holes, a bendable segment and a terminal site. The bendable segment is located between the collecting element and the terminal site. The collecting element is contained in the housing of the DAFC. In contrast, the terminal site is located outside the housing and may extend away from the housing. Since the electrically conducting cathode plate has a bendable segment between the collecting element and the terminal site it is possible to bend the bendable segment and thereby place the terminal site at a desired location relative to the housing of the DAFC. After bending, the terminal site may for example be located along a side of the housing. Thus, the bendable segment provides a greatly flexible design of the DAFC.

Since the terminal site extends away from the housing, it is possible for the DAFC to be in electrical contact with a microelectronic component or a further DAFC of the invention, without the evaporation holes being blocked by other structural features, e.g. a seating or wall or the like of the microelectronic component or the further DAFC. The extension of the terminal site away from the housing especially prevents collection of water, e.g. as water droplets due to condensation, on the terminal site. The terminal site will be in electrical contact with a corresponding terminal of an external unit, and thereby water at the contact point between the terminal site of the DAFC and the external component is prevented. Thus, the DAFC and the electrically conducting cathode plate of the invention allow improved electrical connection to an external component. In a preferred embodiment, the collecting element is located at a surface, e.g. an outer surface, of the housing, so that there is free access to the evaporation holes. For example, the distance, e.g. the normal distance from the surface of the collecting element, to other structures may be up to 1 mm, which is sufficient to allow access, e.g. of a gaseous oxidant, to the DAFC. In other embodiments the distance is larger e.g. up to 10 mm. In an embodiment, the bendable segment, e.g. when the DAFC is mounted in a seating of a microelectronic component, is bent to form an angle between the terminal site and the collecting element in the range of 70° to 110°, e.g. 80° to 100°, such as about 90°. In an embodiment, the electrically conducting cathode plate may have more than one bendable segment. For example, the electrically conducting cathode plate may contain a first bendable segment between the collecting element and an extension part and a second bendable segment between the extension part and the terminal site. When the electrically conducting cathode plate thus has an extension part it is preferred that the electrically conducting cathode plate is made from a single piece of material, e.g. a single piece of metal or a single piece of a polymeric material coated with a conductive metal. The first bendable segment may form a first angle and the second bendable segment may form a second angle and the first and the second angles are selected independently. Thereby, increased flexibility is achieved with respect to positioning the terminal site relative to the DAFC.

The combination of the collecting element having the evaporation holes with a bendable segment in an electrically conducting cathode plate is especially advantageous as it allows close assembly of the DAFC with an external component, e.g. a microelectronic component, and it is simple to electrically connect the DAFC with the external component while at the same time providing free access to the evaporation holes, especially when the evaporation holes are located in an outer surface of the housing.

The electrically conducting cathode plate may have a generally planar structure, e.g. the electrically conducting cathode plate may be "flat", or the electrically conducting cathode plate, or one or more of the collecting element, the bendable segment and the terminal site, may deviate from a planar structure. For example, the housing may have a shape to fit a specific purpose, so that the housing also has a surface deviating from a planar surface. When the collecting element with the evaporation holes deviates from a planar structure the non-planar structure allows more efficient diffusion of gases, e.g. the gaseous oxidant and/or the waste components due to the larger surface area of the collecting element. Moreover, non-planar structures will typically have a greater stiffness than planar structures. In contrast, a planar electrically conducting cathode plate, especially an electrically conducting cathode plate with a planar collecting element, allows easier assembly of the DAFC of the invention with a microelectronic component and/or stacking with further DAFCs of the invention. In a specific embodiment the collecting element has a planar structure. It is to be understood in the context of the invention that when the structure of the electrically conducting cathode plate is described this description refers to the structure of the electrically conducting cathode plate before mounting of the DAFC in a seating of a microelectronic component, i.e. before bending of the bendable segment. Upon or before mounting of the DAFC in a seating of a microelectronic component, the bendable segment will be bent to create appropriate electrical connections between the terminal site and the anode terminal of the DAFC with the corresponding terminals of the microelectronic component. In a certain embodiment the material of the bendable segment allows that the bendable segment is repeatedly bent and straightened without significantly affecting the bendability of the bendable segment. In another embodiment the material of the bendable segment is selected to allow the bendable segment to be bent once since restraightening the bendable segment will break the bendable segment.

The electrically conducting cathode plate may be made from any electrically conducting material or materials. For example, the electrically conducting cathode plate may be made from metal. Alternatively, the electrically conducting cathode plate is made from a non-conducting material, e.g. a thermoplastic polymer, provided with a metallic coating or provided with electrically conducting tracks, e.g. metallic tracks, which may be located on the surface of the polymer or in trenches in the polymer.

The electrically conducting cathode plate may have any thickness as desired. For example, the thickness may be in the range of 10 µm to 1 mm, e.g. 30 µm to 500 µm, or 50 µm to 100 µm. Thicker electrically conducting cathode plates are also contemplated, e.g. with a thickness up to 10 mm. The electrically conducting cathode plate, i.e. the collecting element, the bendable segment and the terminal site, may have a uniform thickness, or the collecting element, the bendable segment and the terminal site may have different thicknesses. It is also possible for each of the collecting element, the bendable segment and the terminal site to have non-uniform thicknesses. In the context of the invention a "uniform thickness" refers to an average thickness with due consideration of natural variations in thickness due to manufacturing, use, etc. of the electrically conducting cathode plate. For example, the uniform thickness may be an average value plus or minus 20%.

In an embodiment the bendable segment is made from a different material than the collecting element and/or the terminal site. For example, the bendable segment may be made from a more ductile material than the collecting element and/or the terminal site. When the collecting element, the bendable segment and the terminal site are made from different materials, each section may be joined as desired. For example, the sections may be glued, welded or soldered together.

In an embodiment the electrically conducting cathode plate is made from a single piece of material, in particular from a metallic material. The material may optionally be coated with a metal, and in the context of the invention, a single piece of material coated with a metal, e.g. another metal, is still considered a single piece of material. It is especially preferred that the electrically conducting cathode plate is made from a single piece of the metallic material, e.g. a single piece of metal, coated with another metal. Ductile metals may be used, but it is preferred that at least the electrically conducting cathode plate is made of a hard and stiff material. Exemplary metallic materials comprise stainless steel, e.g. austenitic stainless steel, nickel, silver, platinum or their alloys; or stainless steel, e.g. austenitic stainless steel, nickel, or their alloys, coated with a layer of gold or platinum. A coating with another metal, e.g. gold or platinum, will typically provide a layer of the other metal at a thickness in the range of 0.1 µm to 50 µm, e.g. 0.5 µm to 10 µm. When the electrically conducting cathode plate is made from a single piece of material manufacture of the DAFC is simplified. Furthermore, the features, e.g. the bendable segment, may be made smaller than what is possible when the sections are made from different materials.

The electrically conducting cathode plate is preferably rigid as a result of the material of which it is made and its design. In this context, rigid is defined so as to mean that the cathode plate is not significantly deformed or deflected during normal use of the fuel cell. The advantage of a cathode plate which is dimensionally stable is that it can provide a uniform pressure on the layers of the fuel cell.

In a further embodiment, the electrically conducting cathode plate is made from a single piece of metal, and the collecting element comprises a guidance hole on either side or guidance holes on both sides of the bendable segment where the bendable segment joins the collecting element. The guidance hole is or the guidance holes are located at the edge of the collecting element and may have any shape, e.g. the guidance hole has or the guidance holes have dimensions in the surface of the collecting element in the range of 10% to 100% of the width of the bendable segment. For example, the guidance hole be any segment of a circle with a diameter in the range of 10% to 100% of the width of the bendable segment, or the guidance holes may be rectangular or polygonal. The guidance holes "guide" the bending of the bendable segment so that the integrity of the collecting element is ensured when the bendable segment has been bent. Thereby, a more robust design of the DAFC is obtained since the collecting element will not be deformed upon bending of the bendable segment. This is especially relevant when the bendable segment and the collecting element have a uniform thickness.

In a specific embodiment, the electrically conducting cathode plate is made from a single piece of metal, and the collecting element and the terminal site have, independently, a thickness in the range of 30 µm to 500 µm, e.g. 100 µm to 500 µm, or 200 µm to 500 µm, and the bendable segment has a thickness in the range of 30 µm to 500 µm, e.g. 50 µm to 200 µm, e.g. 50 µm to 100 µm. In particular, the bendable segment may be thinner than the collecting element and/or the terminal site. When the bendable segment is thinner than the collecting element, deformation of the electrically conducting cathode plate upon bending will be limited to the bendable segment so that the electrically conducting cathode plate will only be deformed at the bendable segment. Thereby, a DAFC with the electrically conducting cathode plate is more robust with respect to mounting in a seating or with respect to connecting electrically to further components. The same effect is relevant when the bendable segment is thinner than the collecting element and the terminal site.

In a specific embodiment, the electrically conducting cathode plate is stamped, e.g. to its final shape, from a sheet of an appropriate metal, e.g. stainless steel, such as austenitic stainless steel. The electrically conducting cathode plate may subsequently be coated with another metal, e.g. gold. In another embodiment, the electrically conducting cathode plate is cut from a metal plate using any appropriate technology, e.g. using shears or laser. The electrically conducting cathode plate may be coated with another metal, e.g. gold, after cutting.

The PEM has a side facing the fuel, i.e. the "anode side", and a side facing the oxidant, i.e. the "cathode side". The power capability of a single DAFC is generally determined by the surface area of the PEM, e.g. at the anode side and the cathode side. The surface area of the anode side of the PEM is typically equal to the surface area of the cathode side of the PEM, although structural features at the respective sides may create differences in the surface areas of the cathode side and the anode side. In the context of the invention, the surface area of the PEM is the "superficial surface area", which does not take increases in surface area due to the surface structure into consideration. For example, the superficial surface area may be in the range of 0.05 cm$^2$ to 10 cm$^2$. The PEM may have any shape desired. For example, the PEM may be square with dimensions of 2 mm×2 mm, 5 mm×5 mm, or 10 mm×10 mm, or the PEM may be circular with diameters of 2.5 mm, 5 mm or 10 mm. Other relevant shapes are rectangular, elliptical, polygonal, etc. When the PEM has a superficial surface area in the range of 0.1 cm$^2$ to 1 cm$^2$, the DAFC can typically provide a continuous power output of up to 30 mW, e.g. in the range of 1 mW to 10 mW, with peaks of 50 mW or more. The voltage will typically be in the range of 0.1 V to 1 V, e.g. 200 mV to 600 mV, regardless of the superficial surface area of the PEM.

The collecting element of the electrically conducting cathode plate has a bulk area corresponding to the area facing the cathode side of the PEM and an effective area corresponding to the bulk area minus the total area of the evaporation holes. In general, the collecting element has the same shape and approximate size, e.g. with respect to the bulk area of the collecting element, as the superficial surface area of the PEM. For example, the collecting element may have dimensions providing a bulk area in the range of 0.05 cm$^2$ to 10 cm$^2$, e.g. the collecting element may have dimensions of 2 mm×2 mm, 5 mm×5 mm, or 10 mm×10 mm, or the collecting element may be circular with diameters of 2.5 mm, 5 mm or 10 mm.

The collecting element of the electrically conducting cathode plate has evaporation holes. The evaporation holes allow that the gaseous oxidant can enter into the DAFC and come into contact with the cathode catalyst, and likewise the evaporation holes allow that the waste components can diffuse away from the DAFC. The evaporation holes typically have a total area in the range of 1% to 90%, e.g. in the range of 5% to 80% or 10% to 50%, of the bulk area of the collecting element. The total area of the evaporation holes may also be referred to as the "evaporation area". The collecting element may contain any number of evaporation holes as desired, but in general the number of evaporation holes is in the range of 4 to 10, e.g. 6. The evaporation holes may have any shape desired, and each evaporation hole may have an area, e.g. in the surface of the collecting element, in the range of 0.1 mm$^2$ to 10 mm$^2$, e.g. 0.5 mm$^2$ to 5 mm$^2$.

The bendable segment is located between the collecting element and the terminal site, and the bendable segment may have any length desired. In the context of the invention, the length of the bendable segment is defined by the distance between the collecting element and the terminal site. For example, the bendable segment may have a length of up to 20 mm, such as in the range of 0.5 mm to 5 mm, e.g. between 1 mm and 2 mm. Correspondingly, the electrically conducting cathode plate may be considered to have a length in the dimension parallel with the length of the bendable segment, and a width in the dimension axial to the length of the bendable segment. The bendable segment also has a width in the dimension axial to the length of the bendable segment. The length of the electrically conducting cathode plate is typically up to 50 mm, e.g. in the range of 5 mm to 25 mm. The width of the electrically conducting cathode plate, e.g. the width of the collecting element, is typically up to 50 mm, e.g. in the range of 5 mm to 25 mm or 2 mm to 10 mm. The width of the bendable segment is generally in the range of 0.5 mm to 2 mm. The terminal site may have a length in the range of 2 mm to 10 mm and a width in the range of 0.5 mm to 5 mm.

The DAFC of the invention comprises a "fuel supply". The fuel supply may be integrated with the DAFC so that the DAFC contains a fuel reservoir. Alternatively, the DAFC is in fluid communication with an external reservoir via an appropriate conduit. Regardless of the location of the reservoir the DAFC may comprise conduits and ports between the fuel supply and the anode catalyst. When the DAFC has a reservoir, the reservoir will typically have a volume in the range of 10 μL to 1 mL, e.g. about 200 μL, about 300 μL or about 400 μL.

The DAFC, including the optional reservoir, may be integrated into a microelectronic device, e.g. a hearing aid, or the DAFC may be a separate unit for mounting in an appropriately designed seating. For example, the seating may have electrical terminals for establishing electrical connection to the anode terminal and the terminal site when the DAFC is mounted in the seating. Regardless whether the DAFC is a separate unit or whether it is integrated into a microelectronic device, the DAFC is contained in a housing. The housing is generally a liquid tight container with appropriate openings for providing alcohol fuel and gaseous oxidant to the fuel cell components. In an embodiment, the housing is made from an electrically non-conducting material, e.g. a polymer, such as a thermoplastic polymer. In another embodiment, the housing is made from an electrically conducting material in electrical connection with the anode catalyst. In this embodiment the housing can be considered to be the anode terminal.

The housing may fully enclose the fuel cell components or one or more of the fuel cell components may provide an outer surface of the housing. For example, in an embodiment the collecting element provides an outer surface, e.g. the "top", of the housing.

The alcohol fuel is generally transported passively to the anode catalyst and the PEM, although it is also possible for the DAFC to have a pump, e.g. an integrated micropump, for transporting the alcohol fuel from the reservoir to the anode catalyst. Likewise, the gaseous oxidant is generally transported passively to the cathode catalyst and the PEM, although active transportation is also contemplated.

In another aspect the invention relates to an electrically conducting cathode plate for a DAFC. The electrically conducting cathode plate comprises a bendable segment between a collecting element with evaporation holes and a terminal site.

In a specific embodiment, the electrically conducting cathode plate is made from a single piece of metal, e.g. stainless steel, such as austenitic stainless steel, of a thickness in the range of 50 μm to 500 μm. The metal may be coated with another metal, e.g. gold. The electrically conducting cathode plate may be planar. The electrically conducting cathode plate has a collecting element with a first dimension in the range of 2 mm and 10 mm, and a second dimension in the range of 2 mm and 10 mm, a bendable segment with a length in the range of 1 mm to 5 mm and a width in the range 0.5 mm to 2 mm, and a terminal site with a length in the range of 2 mm to 5 mm; alternatively, the collecting element is circular with a diameter in the range of 2 mm and 10 mm. The width of the bendable segment may be approximately half the width of the terminal site, e.g. the bendable segment may have a width in the range of 40% to 60% of the width of the terminal site. The bendable segment may have a thickness in the range of 50 μm to 200 μm, or the bendable segment, the collecting element and the terminal site may have uniform thicknesses. The collecting element may have a bulk surface as defined by the first dimension and the second dimension of a rectangular or square shape, or the collecting element may have a bulk surface as defined by the diameter of a circular shape. The collecting element may have a number of evaporation holes in the range of 1 to 20, e.g. 4 to 10, e.g. 6, which evaporation holes may be circular, square, rectangular or polygonal, and have a total area in the range of 10% to 90%, e.g. from 10% to 25%, of the bulk area of the collecting element. Each evaporation hole may be circular and have a diameter in the range of 0.5 mm to 2 mm. The edge of the collecting element may have guidance holes on both sides of the bendable segment where the bendable segment joins the collecting element. The guidance holes may be, or comprise, a segment of a circle where the segment has a height, or "sagitta", in the range of 20% to 70%, e.g. about 50%, of the diameter of the circle. When the collecting element has guidance holes it is preferred that the collecting element and the bendable segment, and optionally also the terminal site, are of uniform thickness.

All embodiments and variations, and their corresponding effects, described for the electrically conducting cathode plate of the DAFC of the invention are equally relevant for the electrically conducting cathode plate of the invention, and vice versa.

BRIEF DESCRIPTION OF THE FIGURES

In the following the invention will be explained in greater detail with reference to the schematic drawings, in which.

DETAILED DESCRIPTION OF THE INVENTION

Figure 1:
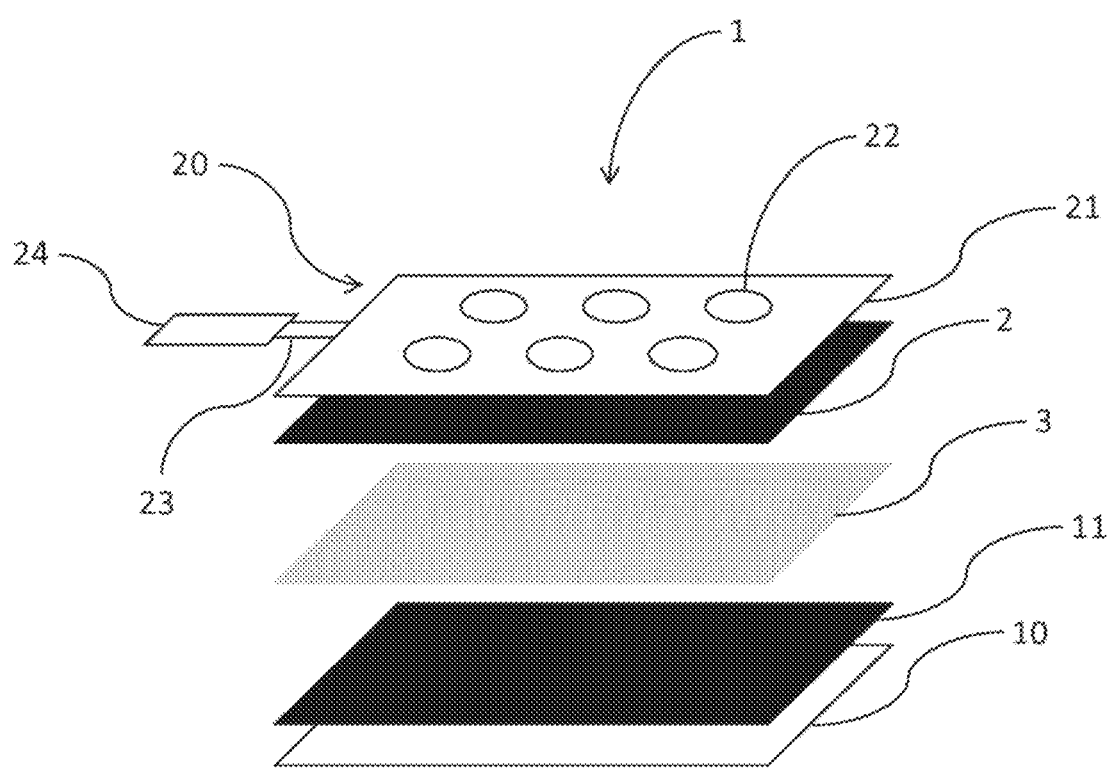
FIG. 1 shows an exploded drawing of fuel cell components of a direct alcohol fuel cell (DAFC) of the invention.

The present invention relates to a direct alcohol fuel cell (DAFC) and to an electrically conducting cathode plate for a DAFC. The electrically conducting cathode plate comprises a bendable segment between a collecting element with evaporation holes and a terminal site, and its collecting element may be contained in a housing of the DAFC, so that the bendable segment and the terminal site extend from the housing to allow an electrical connection between the terminal site and a terminal of an external component.

The DAFC of the present invention is especially suited for a microelectronic device. The microelectronic device may be any electronic device requiring a power input in the range of 1 mW to 350 mW. The microelectronic device may be any microelectronic device, but a preferred microelectronic device is a hearing aid. The DAFC of the present invention may use any alcohol as fuel. Preferred fuels include methanol and ethanol. When the DAFC employs methanol as a fuel it may also be referred to as a direct methanol fuel cell (DMFC). Correspondingly, the DAFC may be a direct ethanol fuel cell (DEFC). The alcohol will typically be provided as an aqueous solution, and the concentration of the alcohol may be chosen freely. Typical concentrations of methanol (in water) for DMFCs are in the range of 1 M to 3 M, but the DAFC of the invention can employ a higher concentration, e.g. in the range of 16 M to 24.7 M, i.e. 100% methanol.

The DAFC contains a proton exchange membrane (PEM). The PEM may also be referred to as a polymer electrolyte membrane, and the two terms may be used interchangeably. At the PEM protons are supplied through a catalytic process of the fuel, and any material with this property may be employed. Exemplary PEMs comprise the perfluorosulphonic acid ionomer sold under the trade name Nafion (e.g. N1110 or Nafion 117) by DuPont who developed it in the 1960s. Other examples of appropriate materials employ linear polymers, such as styrene, styrene-derivatives, poly (arylene ether)s, sulphonation of existing aromatic polymers, co-polymers from sulphonated monomers, poly(imide)s, altered backbone polymers, poly-phosphazene. Yet other approaches have involved the introduction of silica in polymer electrolyte membrane polymer formulations.

The DAFC contains electrodes and catalysts at the anode and at the cathode. The catalyst generally comprises a catalytic metal, e.g. platinum or platinum-ruthenium, on a support material, e.g. carbon, with electron conductive properties. For example, the catalyst may comprise particulate, e.g. nanoparticulate, carbon, with catalyst nanoparticles of platinum or platinum-ruthenium. Appropriate catalysts structures, and their manufacture, for the DAFC are disclosed in WO 2014/005598. Another catalyst is known as Johnson Matthey HiSPEC 13100 which is platinum, nominally 70% on high surface area advanced carbon support.

The DAFC may contain other components as desired. For example, the DAFC may employ water management layers, e.g. nanoporous or microporous structures, and gas diffusion layers, e.g. a microporous layer on which the catalytic structure may be situated, e.g. platinum on a carbon support, which provides the catalytic conversion of the fuel to an electrical current.

Figure 2:
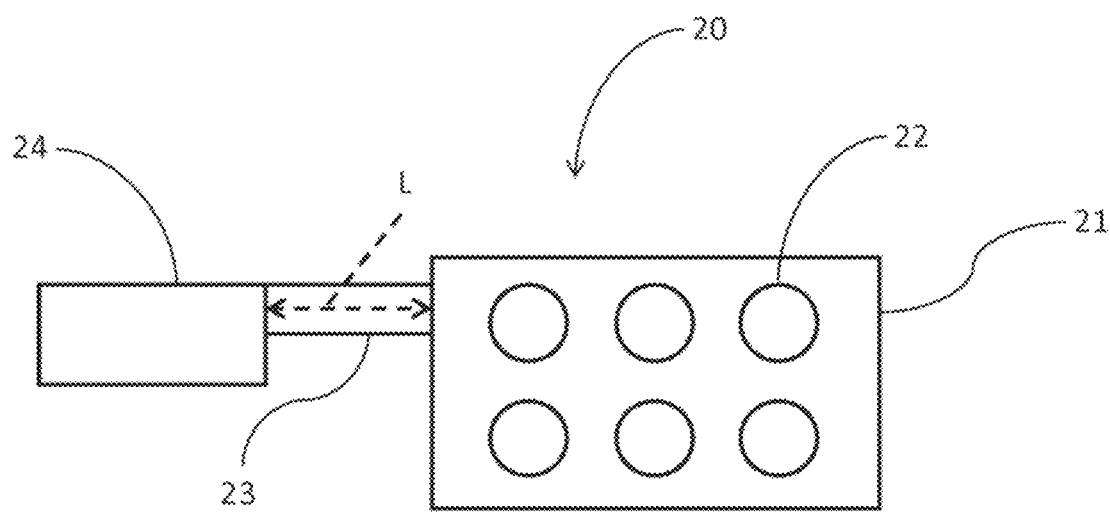
FIG. 2 shows a top view an electrically conducting cathode plate of a DAFC of the invention.
Figure 3:
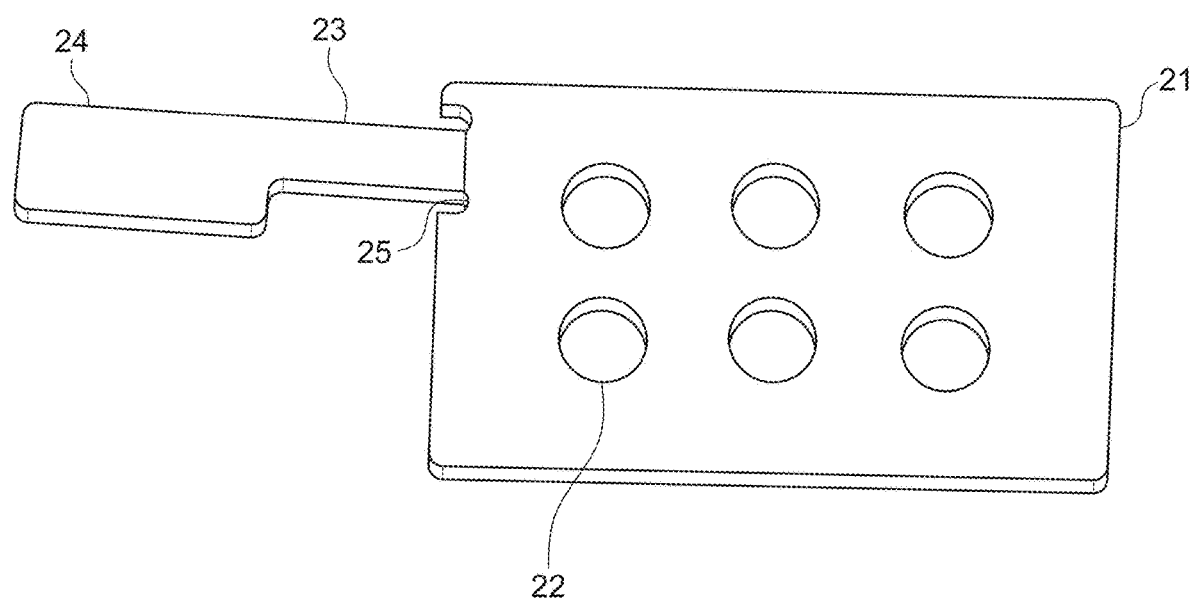
FIG. 3 shows an electrically conducting cathode plate of the invention.

An exploded drawing of fuel cell components is depicted in FIG. 1. It is to be understood that the fuel cell components are contained in a housing as described above, although the housing is not shown in FIG. 1. Thus, FIG. 1 shows a DAFC 1 with a stack containing an anode terminal 10, an anode catalyst 11, a PEM 3, a cathode catalyst 2, and an electrically conducting cathode plate 20. The electrically conducting cathode plate 20 is depicted in a top view in FIG. 2, and a photo of a specific embodiment of the electrically conducting cathode plate 20 is shown in FIG. 3.

The electrically conducting cathode plate 20 has been cut from a single piece of austenitic stainless steel. The electrically conducting cathode plate 20 has a uniform thickness of about 200 μm, and it contains a collecting element 21 of 4.5 mm×8 mm thus providing a bulk area of 36 mm$^2$. The collecting element 21 has six circular evaporation holes 22 of a diameter of 1 mm so that the evaporation area is 4.7 mm$^2$ corresponding to about 13% of the bulk area. The electrically conducting cathode plate 20 has a bendable segment 23 between the collecting element 21 and the terminal site 24. The bendable segment 23 has a length L of 2 mm in the direction between the collecting element 21 and the terminal site 24; this direction is indicated with an arrow. The total length of the electrically conducting cathode plate 20 in this direction is 23 mm. The width of the bendable segment 23 is 0.5 mm, and the width of the terminal site 24 is 1 mm. The embodiment of the electrically conducting cathode plate 20 shown in FIG. 3 has guidance holes 25 on both sides of the bendable segment 23. The two guidance holes 25 are located at the edge of the collecting element 21 where the bendable segment 23 joins the collecting element 21. Specifically, the guidance holes 25 have a width, i.e. in the axial dimension to the length of the bendable segment 23, of about 60% of the width of the bendable segment 23, and a length of about 100% of the width of the bendable segment 23.

The electrically conducting cathode plate 20 is located at the top surface of a housing (not shown) so that the collecting element 21 is in contact with a cathode catalyst 2, specifically the cathode catalyst 2 is Johnson Matthey HiSPEC 13100. The collecting element 21 is aligned with the PEM 3 (Nafion N117)—the PEM has a superficial surface area of 36 mm² with dimensions of 4.5 mm×8 mm. An alternative PEM is Nafion N1110. The bendable segment 23 extends from the housing so that the terminal site 24 also extends from the housing. The housing of the DAFC 1 has an anode catalyst 11 (Johnson Matthey HiSPEC 13100) in contact with the anode terminal 10.

In an embodiment the anode terminal 10 is shaped as a container, which constitutes a part of the housing.

The anode terminal 10 may have fuel inlet holes, e.g. at the bottom of the container. The outside of the housing, e.g. the anode terminal 10, is provided with an electrically insulating material, e.g. a polymer material, to electrically isolate the anode terminal 10 from the terminal site 24. Before mounting in a seating of a microelectronic component the terminal site 24 is bend toward the housing, e.g. at an angle of about 90° relative to the collecting element 21, so that the terminal site 24, which is then electrically isolated from the anode terminal 10 by the electrically insulating material, provides a cathodic terminal site adjacent to the anode terminal 10. The DAFC can then be mounted in a seating of a microelectronic component with appropriately located terminals for the DAFC to be electrically connected to the microelectronic component. When the DAFC is mounted in the seating the collecting element 21 will be located, i.e. at the surface, so that there is free access to the evaporation holes 22.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A direct alcohol fuel cell (DAFC) comprising:
an anode terminal electrically connected to an anode catalyst in fluid communication with a fuel supply,
a cathode catalyst in fluid communication with a gaseous oxidant, an electrically conducting cathode plate having a collecting element with evaporation holes, a bendable segment and a terminal site, which collecting element is electrically connected to the cathode catalyst, and
a housing containing the collecting element, and a proton exchange membrane (PEM) between the anode catalyst and the cathode catalyst,
wherein the collecting element comprises at least one guidance hole on an edge of the collecting element, the at least one guidance hole being positioned on at least one side of the bendable segment at a point where the bendable segment joins the edge of the collecting element.

2. An electrically conducting cathode plate for a DAFC, the electrically conducting cathode plate comprising a bendable segment between a collecting element with evaporation holes and a terminal site,
wherein the collecting element comprises at least one guidance hole on an edge of the collecting element, the at least one guidance hole being positioned on at least one side of the bendable segment at a point where the bendable segment joins the edge of the collecting element.

3. The DAFC according to claim 1, wherein the electrically conducting cathode plate is made from a single piece of material.

4. The DAFC according to claim 1, wherein the electrically conducting cathode plate has a thickness in the range of 10 µm to 1 mm.

5. The DAFC according to claim 1, wherein the collecting element has a bulk area in the range of 0.05 cm² to 10 cm².

6. The DAFC according to claim 1, wherein the collecting element is located at a surface of the housing.

7. The electrically conducting cathode plate according to claim 2, wherein the electrically conducting cathode plate is made from a single piece of material.

8. The electrically conducting cathode plate according to claim 2, wherein the electrically conducting cathode plate has a thickness in the range of 10 µm to 1 mm.

9. The electrically conducting cathode plate according to claim 2, wherein the collecting element has a bulk area in the range of 0.05 cm² to 10 cm².

10. A direct alcohol fuel cell (DAFC) comprising:
an anode terminal electrically connected to an anode catalyst in fluid communication with a fuel supply,
a cathode catalyst in fluid communication with a gaseous oxidant;
an electrically conducting cathode plate having a collecting element with evaporation holes, a bendable segment and a terminal site, the collecting element being electrically connected to the cathode catalyst;
a proton exchange membrane (PEM) between the anode catalyst and the cathode catalyst; and
a housing containing the collecting element,
wherein the electrically conducting cathode plate comprises one or more depressions where the bendable segment joins the collecting element such that the collecting element does not deform upon bending of the bendable segment.

* * * * *